(12) United States Patent
Ziolek et al.

(10) Patent No.: US 10,386,631 B2
(45) Date of Patent: Aug. 20, 2019

(54) LASER MACHINING DEVICE

(71) Applicant: TRUMPF Laser Marking Systems AG, Gruesch (CH)

(72) Inventors: Carsten Ziolek, Seewis Dorf (CH); Stefan Marzenell, Malans (CH)

(73) Assignee: TRUMPF Schweiz AG, Gruesch (CH)

( * ) Notice: Subject to any disclaimer, the term of this patent is extended or adjusted under 35 U.S.C. 154(b) by 0 days.

(21) Appl. No.: 14/657,256

(22) Filed: Mar. 13, 2015

(65) Prior Publication Data

US 2015/0185472 A1     Jul. 2, 2015

Related U.S. Application Data

(63) Continuation of application No. PCT/EP2013/069042, filed on Sep. 13, 2013.

(30) Foreign Application Priority Data

Sep. 14, 2012    (EP) ..................................... 12184531

(51) Int. Cl.
     *B23K 26/08*          (2014.01)
     *B23K 26/082*        (2014.01)
     (Continued)

(52) U.S. Cl.
     CPC .......... *G02B 26/105* (2013.01); *B23K 26/082* (2015.10); *B23K 26/352* (2015.10); *B23K 26/361* (2015.10); *G02B 26/0825* (2013.01)

(58) Field of Classification Search
     USPC .... 359/224.1, 225.1, 223.1–226.2, 871, 872, 359/873, 874, 875, 876, 881, 882, 883,
     (Continued)

(56) References Cited

U.S. PATENT DOCUMENTS

| | | | |
|---|---|---|---|
| 4,012,110 A | * | 3/1977 | Schael ..................... G02B 7/12 |
| | | | 359/375 |
| 4,269,486 A | | 5/1981 | Shintani |
| (Continued) | | | |

FOREIGN PATENT DOCUMENTS

| | | |
|---|---|---|
| CN | 101269441 A | 9/2008 |
| CN | 101774083 A | 7/2010 |
| (Continued) | | |

OTHER PUBLICATIONS

Charles I. Hubert, Electric Machines Theory, Operation, Applications, Adjustments, and Control, MacMillan Publishing Company, 1991, ISBN:0-675-21136-0, p. 18, Figure 1-10): Hubert_cover page.*

(Continued)

*Primary Examiner* — Ibrahime A Abraham
*Assistant Examiner* — Gyounghyun Bae
(74) *Attorney, Agent, or Firm* — Fish & Richardson P.C.

(57) ABSTRACT

A laser beam machining device having a laser beam source and an equipment for deflecting a laser beam of the laser beam source for machining a workpiece is provided. The equipment includes a mounting body, a structural member having a reflecting surface, a flexible element by which the structural member is deflectable around an arbitrary space axis about an angle of deflection, a first forcing component and at least one second forcing component, whereby at least one of the forcing components are controllable such that the two forcing components are attracted towards each other or repel each other depending on the triggering. One of the forcing components is coupled to the structural member and the two forcing components are arranged and cooperate such that the structural member deflects around the arbitrary space axis about a predetermine angle of deflection.

15 Claims, 6 Drawing Sheets

(51) Int. Cl.
*G02B 26/10* (2006.01)
*G02B 26/08* (2006.01)
*B23K 26/361* (2014.01)
*B23K 26/352* (2014.01)

(58) Field of Classification Search
USPC .................................................. 359/198
See application file for complete search history.

(56) References Cited

U.S. PATENT DOCUMENTS

| | | | | |
|---|---|---|---|---|
| 4,502,752 A * | 3/1985 | Montagu | .............. | G02B 7/1821 310/27 |
| 4,670,638 A | 6/1987 | Pavlin | | |
| 4,850,687 A * | 7/1989 | Reis | .............. | A61B 3/0075 359/223.1 |
| 4,887,197 A * | 12/1989 | Effinger | .............. | F21S 10/06 362/259 |
| 4,911,711 A * | 3/1990 | Telfair | .............. | A61F 9/00804 219/121.6 |
| 4,919,499 A * | 4/1990 | Aiba | .............. | H04N 1/1135 347/257 |
| 4,923,263 A * | 5/1990 | Johnson | .............. | G02B 26/10 250/235 |
| 5,009,473 A * | 4/1991 | Hunter | .............. | G02B 26/10 359/214.1 |
| 5,097,355 A * | 3/1992 | Eden | .............. | H02K 33/16 359/199.1 |
| 5,280,377 A * | 1/1994 | Chandler | .............. | G01R 5/16 185/37 |
| 5,280,491 A * | 1/1994 | Lai | .............. | B23K 26/06 359/347 |
| 5,428,473 A * | 6/1995 | Takizawa | .............. | G11B 7/0925 310/75 R |
| 5,451,775 A * | 9/1995 | Shimada | .............. | G11B 7/08564 250/230 |
| 5,571,430 A * | 11/1996 | Kawasaki | .............. | B23K 26/08 219/121.74 |
| 5,754,219 A * | 5/1998 | Ruckl | .............. | B23K 26/032 347/256 |
| 5,867,512 A * | 2/1999 | Sacher | .............. | H01S 5/143 372/107 |
| 5,870,219 A * | 2/1999 | Plesko | .............. | G02B 26/101 235/462.35 |
| 5,965,042 A * | 10/1999 | Saitoh | .............. | B23K 26/16 219/121.68 |
| 6,198,565 B1 * | 3/2001 | Iseki | .............. | G02B 26/0841 348/E5.137 |
| 6,233,086 B1 * | 5/2001 | Hardiman | .............. | A63J 17/00 359/225.1 |
| 6,256,131 B1 * | 7/2001 | Wine | .............. | G02B 26/0833 310/308 |
| 6,259,548 B1 * | 7/2001 | Tsugai | .............. | B81B 3/004 359/224.1 |
| 6,275,319 B1 * | 8/2001 | Gadhok | .............. | H02K 7/09 359/198.1 |
| 7,038,830 B2 * | 5/2006 | Tsuboi | .............. | G02B 26/0841 359/290 |
| 7,102,805 B2 * | 9/2006 | Nomura | .............. | G02B 26/10 347/243 |
| 7,149,020 B2 * | 12/2006 | Finkelstein | .......... | H04N 9/3129 348/E9.026 |
| 7,286,273 B2 * | 10/2007 | Ikegame | .............. | G02B 6/359 359/201.1 |
| 7,388,699 B1 * | 6/2008 | Coffee | .............. | G02B 26/10 359/212.1 |
| 7,497,578 B2 * | 3/2009 | Wood | .............. | G03B 21/14 335/299 |
| 7,529,011 B2 * | 5/2009 | Fujii | .............. | G02B 26/0841 359/224.1 |
| 7,738,153 B2 * | 6/2010 | Harris | .............. | G02B 26/101 359/212.1 |
| 8,319,145 B2 * | 11/2012 | Rosario | .............. | B23K 15/08 219/121.19 |
| 2003/0210453 A1 * | 11/2003 | Noda | .............. | G02B 26/0841 359/290 |
| 2004/0061960 A1 | 4/2004 | Heaton | | |
| 2004/0184124 A1 * | 9/2004 | Ikegame | .............. | G02B 26/105 359/204.1 |
| 2004/0190097 A1 * | 9/2004 | Shpizel | .............. | G02B 26/0833 359/220.1 |
| 2005/0078346 A1 * | 4/2005 | Turner | .............. | G02B 26/085 359/225.1 |
| 2009/0128878 A1 * | 5/2009 | Jun | .............. | G02B 26/105 359/199.3 |
| 2009/0185253 A1 * | 7/2009 | Tani | .............. | G02B 26/0858 359/221.2 |
| 2009/0323739 A1 | 12/2009 | Elliott et al. | | |
| 2010/0033856 A1 * | 2/2010 | Uchiyama | .............. | B81B 3/004 359/850 |
| 2010/0253990 A1 * | 10/2010 | Shimizu | .............. | G02B 26/0816 359/199.1 |
| 2012/0044474 A1 * | 2/2012 | Hauf | .............. | G02B 7/1815 355/67 |
| 2012/0313850 A1 * | 12/2012 | Ishida | .............. | G02B 27/01 345/156 |
| 2013/0301097 A1 * | 11/2013 | Hudman | .............. | H04N 9/3129 359/212.1 |
| 2014/0118809 A1 * | 5/2014 | Honda | .............. | G02B 26/10 359/199.3 |

FOREIGN PATENT DOCUMENTS

| | | |
|---|---|---|
| EP | 0 661 127 | 7/1995 |
| EP | 2343147 A1 | 7/2011 |
| FR | 2622710 A1 | 5/1989 |
| JP | 55-093544 | 7/1980 |
| JP | 2004301888 A | 10/2004 |
| JP | 2009204916 A | 9/2009 |
| JP | 2009244753 A | 10/2009 |
| JP | 2010139991 A | 6/2010 |
| JP | 2011056522 A | 3/2011 |

OTHER PUBLICATIONS

Charles I. Hubert, Electric Machines Theory, Operation, Applications, Adjustments, and Control, MacMillan Publishing Company, 1991, ISBN:0-675-21136-0, p. 18, Figure 1-10): Hubert_ISBN Number.*

Charles I. Hubert, Electric Machines Theory, Operation, Applications, Adjustments, and Control, MacMillan Publishing Company, 1991, ISBN:0-675-21136-0, p. 18, Figure 1-10): Hubert_Stator_Figure 1-10.*

International Search Report from corresponding PCT Application No. PCT/EP2013/069042, dated Dec. 20, 2013, 12 pages.

Notification of Transmittal of Translation of the International Preliminary Report on Patentability and Written Opinion for corresponding PCT Application No. PCT/EP2013/069042, dated Mar. 25, 2015, 16 pages.

Office Action in Japanese Application No. 2015-531578, dated Jun. 4, 2018, 16 pages (with English translation).

* cited by examiner

LASER MACHINING DEVICE

CROSS-REFERENCE TO RELATED APPLICATIONS

This application is a continuation of and claims priority under 35 U.S.C. § 120 to PCT Application No. PCT/EP2013/069042 filed on Sep. 13, 2013, which claimed priority to European Application No. EP 12 184 531.7, filed on Sep. 14, 2012. The contents of both of these priority applications are hereby incorporated by reference in their entirety.

TECHNICAL FIELD

The invention relates to a laser machining device for machining a workpiece having an equipment for deflecting a laser beam, in particular, to a laser machining device especially used for marking a workpiece.

BACKGROUND

For marking workpieces, laser machining devices in which, according to the requested marking to be applied, the laser beam is deflected by means of a scanner optics and the laser beam is focused to the workpiece are known.

The scanner optics comprises two movable mirrors deflecting the laser beam in two directions. The laser beam impinging onto a surface of the workpiece then marks the surface. A mark, e.g. accomplished by a so-called "vector-labeling", includes a lot of single lines formed by dots or, when accomplished by a "bitmap-labeling" wherein an area is screened, of the areas formed by single points. Thereto, the laser beam is guided across the workpiece at express speed. The mirrors are usually moved using so-called Galvos, i.e., galvanometers, respectively including a mirror provided on a magnetically driven axis. By applying a voltage at coils, a magnetic field is created and the axis comprising a permanent magnet is rotated according to the current intensity against a spring, whereby the mirror is deflected (moving magnet). There is also an option that the magnet is fixedly attached and the coil is moved (moving coil). A detector, e.g., a photo sensor can be used to detect an orientation of the mirror, i.e., an angle of rotation of the mirror. From the principle structure of the Galvos, at least two Galvos each having one mirror are conventionally necessary for a planar machining of a workpiece. Because several elements are typically necessary, the power demand of Galvos is high, and the system requires an appropriate control, conventional systems are bulky and are associated with high costs. Further, where mirror position is monitored, separate position detecting systems for the respective axis for each Galvo are necessary.

SUMMARY

Laser machining devices are disclosed that have reduced space requirements relative to conventional Galvo based systems and which can be manufactured and operated in an inexpensive manner.

Various aspects of the invention are summarized as follows.

In general, in a first aspect, the invention features a laser machining device for machining a workpiece. The laser machining device includes a laser beam source and an equipment for deflecting a laser beam of the laser beam source. The equipment includes a mounting body, a structural member having a reflecting surface, and a flexible element directly joining the structural member to the mounting body. The structural member is deflectable around an arbitrary space axis by an angle of deflection. The equipment also includes a first forcing component and at least one second forcing component. At least one of the first and at least one second forcing components are controllable such that the two forcing components are attracted towards or repelled from each other upon triggering. One of the first and at least one second forcing components are coupled to the structural member and the first and at least one second forcing components are arranged and cooperate such that the structural member is deflectable around the arbitrary space axis about a predetermined deflection angle.

Implementations of the laser machining device may include one or more of the following features. For example, the first forcing component can be at least one magnet or at least one first electrostatically chargeable member, and wherein the second forcing component can be at least one current-carrying member with an electromagnetic force field or at least one second electrostatically chargeable member. The at least two current-carrying elements or the at least two electrostatically chargeable members can be arranged to rotate vertically with respect to another.

The equipment can further include an angle detection device for detecting an actual angle of deflection of the structural member and an angle of deflection correcting control device for controlling a deflection of the structural member depending on the predetermined angle of deflection and the actual angle of deflection so that the actual angle of deflection corresponds to the predetermined angle of deflection.

The first forcing component at the structural member can be arranged opposite the reflecting surface, at a joining element of the structural member, or at the structural member to a side of the reflecting surface.

The second forcing component is arranged to a side of the reflecting surface or below the reflecting surface.

The flexible element is arranged below the reflecting surface or to a side of the reflecting surface.

The angle of deflection of the reflecting surface is at least ±5 degrees (e.g., ±10 degrees).

The laser machining device can include an optical device for focusing the laser beam onto the workpiece.

The laser beam impinging onto the reflecting surface can generate a laser spot having a pre-determined shape and maximum predetermined dimensions, and wherein the reflecting surface has a shape and dimensions corresponding substantially to the predetermined shape and the maximum dimensions of the laser spot.

The laser machining device can include MEMS members. The laser machining device can include a control device for controlling a switching-on and a switching-off of the laser beam and for controlling a deflection about the predetermine angle of deflection so that a predetermined portion of a track can be followed with the laser beam on the workpiece. The laser machining device can include a laser resonator attached to the mounting body.

In some embodiments, the laser machining device is a laser marking device.

In general, in another aspect, the invention features a method for applying a laser marking on a workpiece by the laser machining device. The method includes the steps of: (a) adjusting the predetermined angle of deflection of the reflecting surface by controlling the first and/or second forcing component; (b) switching-on a laser beam using a control device of the laser machining device; (c) controlling the first and/or second forcing component such that the laser beam follows a predetermined portion of a track on the workpiece; and (d) switching-off the laser beam using the control device of the laser machining device.

By the formation of the described laser machining devices, a deflection unit can be built in a compact and inexpensive manner of a mounting body, a structural member including a reflecting surface and a first forcing component, and of at least one second forcing component interacting with the first forcing component so the structural member is deflectable around an arbitrary space axis. Thereby, the reflecting surface is deflectable such that a laser beam deflected by the reflecting surface can scan an area. As a result, it is possible to mark a workpiece stationary with respect to the equipment in a two-dimensional manner. Due to the low moved masses, only low current is necessary for operation.

The invention is explained by means of embodiments with the aid of the attached drawings.

DETAILED DESCRIPTION

Figure 1:
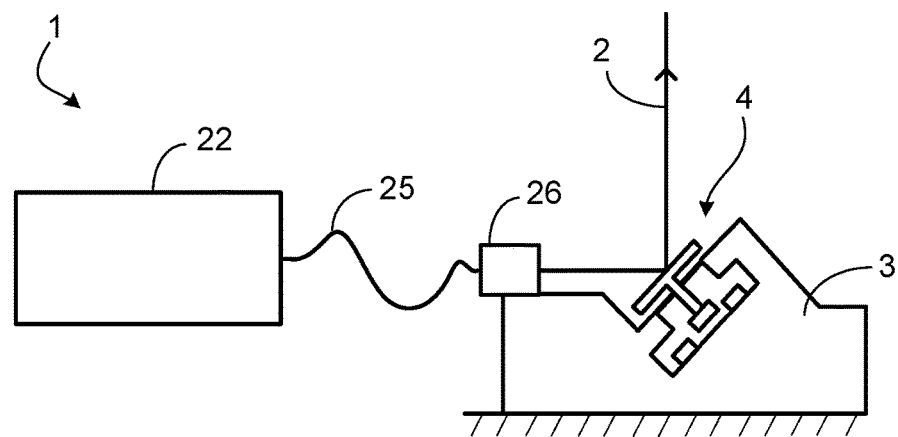
FIG. 1 shows a schematic diagram of an embodiment of a laser machining device having an equipment for deflecting the laser beam.

FIG. 1 shows a schematic diagram of a laser machining device 1 having a laser beam source 22 and equipment 4 for deflecting a laser beam 2. The laser beam source 22 is a solid-state laser in the form of a fiber laser, however, other sources are also possible. For example, beam source 22 may be, e.g., a disc laser or a rod laser. In some embodiments, the laser beam source 22 is a gas laser.

The laser machining device 1 in FIG. 1 includes a conveyance fiber 25 leading the laser beam 2 via a decoupling optics to the deflection equipment 4. The deflection equipment 4 and a decoupling optics 26, e.g., a collimation optics, are arranged on a common mounting plate 3. Alternatively, the decoupling optics 26 and deflection equipment 4 can be arranged on separate mounting plates.

In FIG. 1, the conveyance fiber 25 for a laser light transport is shown. Alternatively, a free beam coupling between the laser beam source 22 and the deflection equipment 4 can also be provided.

Figure 2:
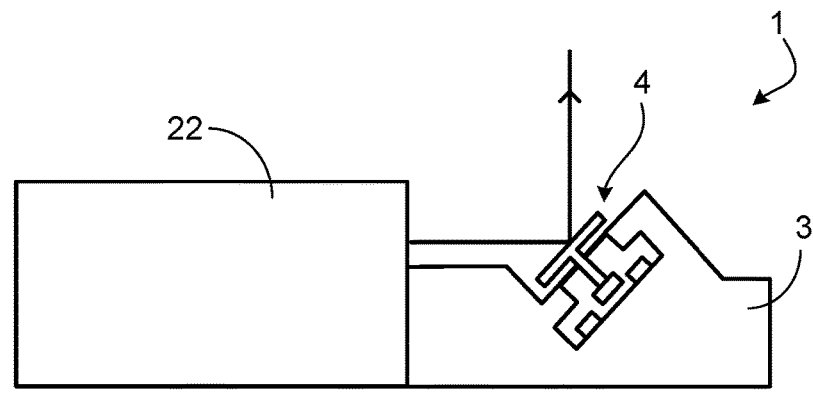
FIG. 2 shows a schematic diagram of a further embodiment of the laser machining device having the equipment for deflecting the laser beam.

FIG. 2 shows a further embodiment of the laser machining device 1. Here, different from the laser machining device 1 in FIG. 1, the deflection equipment 4 is not separated spatially from the laser beam source 22 but the mounting plate 3 of the deflection equipment 4 is attached, e.g., screwed or bonded, to the laser beam source 22. Hereby, the decoupling optics can be integrated in the laser beam source.

Figure 3:
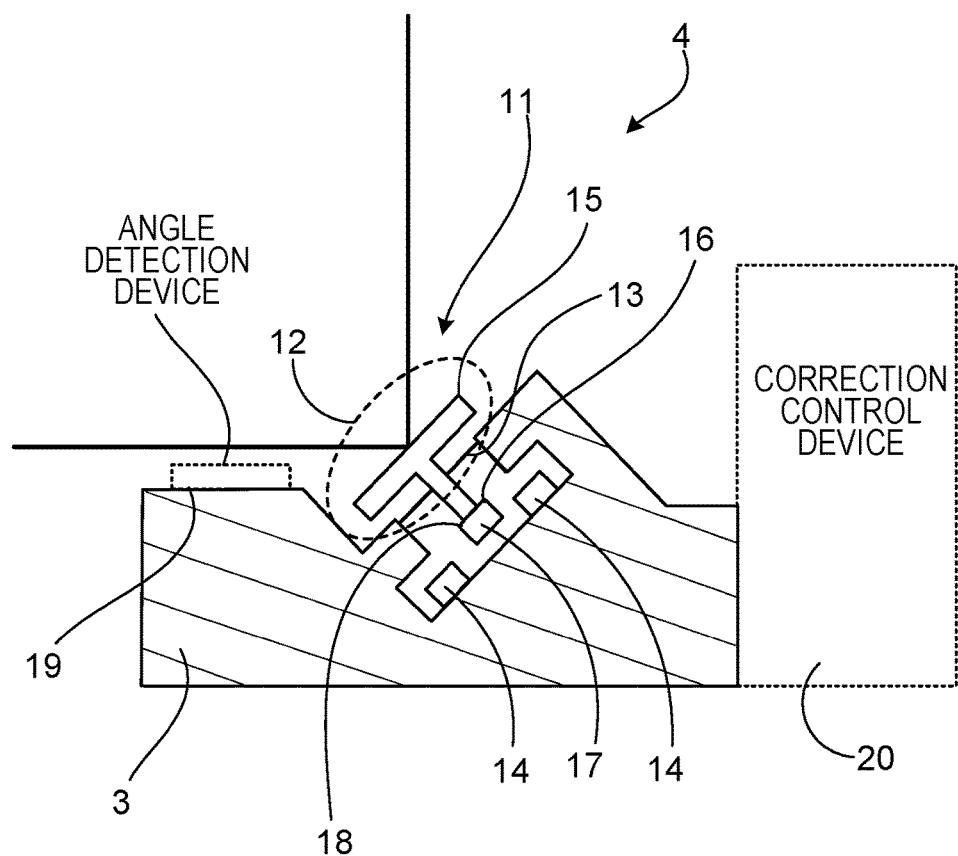
FIG. 3 shows an enlarged sectional view of the equipment for deflecting a laser beam of FIG. 1 or FIG. 2.

FIG. 3 shows an enlarged sectional view of the equipment 4 for deflecting the laser beam 2 of FIG. 1 or 2. The equipment 4 comprises the mounting body 3. A compact deflection unit 11 includes a structural member 12, a flexible element 13 and, as current-carrying elements, two pairs of coils 14.

The mounting body 3 is processed, e.g., partly gold-plated and structured. Furthermore, so-called MEMs-elements (Micro-Electro-Mechanical-Systems), parts of the equipment 4 are optionally separately manufactured. Hereby, the matter is a hybrid construction composed of parts manufactured by MEMS-techniques as well as of parts "traditionally" manufactured, i.e., by material removal and non-cutting forming.

The so-called MEMS-elements include in particular the structural member 12, having a reflecting surface 15 and a joining element 16, and the flexible element 13. The structural member 12, at least in the portion of the reflecting surface 15, is composed of quartz glass and it has a dielectric coating. Alternatively, the portion of the reflecting surface 15 can also be composed of silicon, ceramics or metal and/or it can have a metallic coating. The dielectric/metallic coating is provided on the reflecting surface 15, however, it can alternatively also be additionally provided on the opposite side.

By the manufacturing process, a chamber 18 is formed in the mounting body 3. The chamber 18 accommodates the pairs of coils 14, the flexible element 13 and the joining element 16 with a magnet as a first forcing component 17. Alternatively, a chamber 18 should not imperatively be formed but a building space in which the members can be arranged can be provided.

The reflecting surface 15 should be as large as possible so that a laser spot as large as possible can be redirected in order to be able to generate a small laser spot on the work-piece. However, the inertial mass of the structural member 12 increases with an increased size of the reflecting surface 15, whereby larger motion forces are necessary. Thereby, enhanced driving elements, i.e., the current-carrying elements 14 and/or the magnet may be necessary. In the present example, the width and length of the square reflecting surface 15 of the structural member 12 are 7.5 mm×7.5 mm. In general, they are at least 2 mm×2 mm but less than 15 mm×15 mm and preferably less than 10 mm×10 mm. Since the laser beam 2 impinges at an angle which is not a perpendicular incidence, the laser spot on the reflecting surface 15 is not circular but in particular elliptical. In order to design the reflecting surface 15 as small as possible yet sufficiently, the reflecting surface 15 can therefore also have an elliptic, a circular or another suitable shape and other dimensions. A shape and dimensions of the reflecting surface 15 then correspond to a predetermined shape and maximum dimensions of the laser spot. The reflecting surface is planar, however, it can in certain embodiments be curved in one or two dimensions.

The structural member 12 is furthermore provided with the joining element 16. The joining element 16 is arranged in a portion facing away from the reflecting surface 15. The joining element 16 includes the magnet 17 in an end of the joining element opposite to the reflecting surface 15. Other arrangements are possible. In some embodiments, the magnet 17 is provided at an arbitrary location of the joining element 16 or at another suitable location of the structural member 12. Alternatively, several magnets can be arranged at arbitrary locations, provided they collectively provide a magnetic field suitable for operation of the equipment 4.

The joining element 16 is joined to the mounting body 3 via the flexible element 13. The flexible element 13 may be a spring element joining the joining element 16 and the mounting body 3. The flexible element 13 is arranged below the reflecting surface 15. Furthermore, alternatively to the arrangement below the reflecting surface 15, the flexible element 13 can be arranged at the side of the reflecting surface 15. Thereby, the height of the equipment 4 may be reduced. By the provision of the flexible element 13, the structural member 12 is pivotable around an arbitrary space axis.

The pivoting around the arbitrary space axis can be understood as a pivoting around one axis or a superimposed pivoting around two axes of a space coordinate system, whereby neither of the axes is arranged perpendicular with respect to the reflecting surface 15. This would merely lead to a rotation of the reflecting surface 15 without changing a deflection of the laser beam 2. By pivoting around the arbitrary space axis, a deflection of the structural member 12 and, thereby, of the reflecting surface 15 about a deflection angle is enabled. This enables the deflection of the laser beam 2 to an arbitrary point of a surface being delimited by the pivot range of the reflecting surface 15.

A first pair of coils 14 includes two coils arranged in a plane opposite with respect to the magnet 17. When current is applied to it, the first pair of coils 14 generates a resulting magnetic field having an axis. A further pair of coils 14 is rotated such that the axis of the magnetic field of the further pair of coils 14 is rotated about 90 degrees parallel to the plane in which the first pair of coils 14 is arranged so that the pairs of coils 14 are arranged rotated perpendicularly with respect to another. Alternatively, several pairs of coils 14 are possible with the pairs of coils 14 having a suitable angle with respect to another, i.e., other than perpendicular. The magnet 17 should be deflected by the magnetic fields generated by the pairs of coils 14 such that the structural member 12 pivots around the arbitrary space axis by a deflection angle. The alteration of the optical angle of deflection of the laser beam 2 is at least ±10 degrees and, in some embodiments, preferably ±20 degrees. Therefrom, an angle of deflection of the reflecting surface 15 of ±5 degrees or preferably ±10 degrees results.

The pairs of coils 14 are arranged below the reflecting surface 15, however, in some embodiments, they can be arranged to the side of the reflecting surface 15 in order to reduce the height of the equipment 4 for deflecting the laser beam 2.

The pairs of coils 14 are controlled such that the structural member 12 and, thus, the reflecting surface 15 do not oscillate resonantly so that a predetermined angle of deflection is adjustable.

In a case in which high currents are applied to the pairs of coils 14, the coils may generate sufficient heat to disrupt operation or destroy the deflection equipment 4. In order to operate with higher currents, if necessary, a device actively generating a temperature gradient below the pairs of coils 14 is optionally provided. For example, this device can be a Peltier-element which is directly attached below the coil. Alternatively, a mounting plate 9 with water running through can be used.

As a second forcing component 14, as an alternative to the two pairs of coils 14, parallel conducting paths are possible as the current-carrying elements. In such embodiments, deflection is generated magnetically. In certain embodiments, an electrical deflection using a first electrostatically chargeable element, e.g., a cylinder charged using the flexible element 13, instead of the magnet as the first forcing component 17, and using a second electrostatically chargeable element as the second forcing component 14, e.g., a cylinder element differently charged, may be used instead of the pairs of coils. At least one of the first forcing component 17 and the second forcing component 14 should be coupled to the structural member 12 and at least one of the two forcing components 14, 17 should be configured such that it is controllable such that the two forcing components are attracted to each other or repel each other depending on the triggering.

The equipment 4 is optionally provided with an angle detection device 19. In some embodiments, the angle detection device 19 is a so-called PSD (Position Sensitive Detector). The PSD detects a position of a separate auxiliary laser beam deflected from the reflecting surface 15 or from a rear side therefrom to a surface. By the position of the separate auxiliary laser beam, the actual angle of deflection of the reflecting surface 15 can be detected by the angle detection device 19. Alternatively, the angle detection device 19 can also use shifts of the inductivity of the coils of the pairs of coils 14 for detecting the angle of deflection. As a further alternative, the change of the angle can also be detected by the change of the position of the magnet, e.g., by Hall-sensors. Further alternatives for an angle detection device 19 may use an LED instead of the auxiliary laser beam source and/or may use a photo diode or a piezoresistive sensor.

Furthermore, the device 4 for deflecting the laser beam 2 is optionally provided with an angle of deflection correction control device 20. The angle of deflection correction control device 20 controls the pairs of coils 14 such that the predetermined angle of deflection of the structural member 12 is reached.

Figure 4:
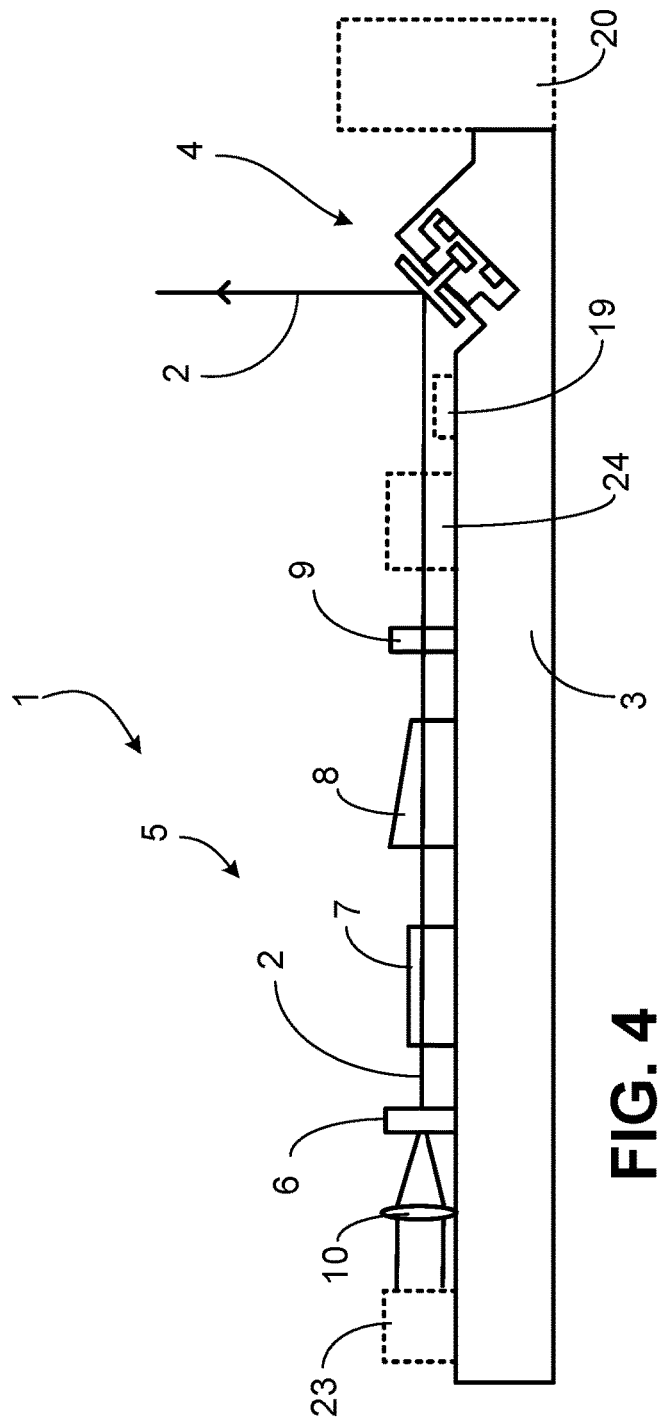
FIG. 4 shows a schematic diagram of a further embodiment of the laser machining device in which a laser resonator and the equipment for deflecting the laser beam are arranged on a common mounting plate.

FIG. 4 shows a schematic diagram of a further embodiment of the laser machining device 1 having a rod-shaped solid state medium as an active medium and the device 4 for deflecting the laser beam 2. In this example, the laser machining device 1 includes the mounting body 3 on which a laser resonator 5 is arranged and which includes the equipment 4.

The laser resonator 5 includes a HR-end mirror 6, a solid state laser medium 7, a Q-switch 8 and a decoupling mirror 9. Optionally, a frequency conversation of the laser beam 2 is possible in order to work with different wavelengths and, thus, to optimally machine different materials.

By a pump beam source 23, which is optionally also arranged on the mounting body 3, a pump radiation is generated and radiated to the laser resonator 5. For focusing the pump radiation into the laser resonator 5, the laser machining device 1 includes a lens 10, e.g., made of quartz glass or other material. In some embodiments, the lens 10 is a GRIN-lens, i.e., a gradient index lens. Alternatively, a pump beam source coupled to the laser resonator 5 by means of a fiber can be provided.

The solid state laser medium 7 is composed of Yb:YAG, i.e., an ytterbium doped yttrium-aluminum-garnet laser or, alternatively, of Nd:YAG or Nd:vanadate. Alternatively, other solid state laser mediums may be used, such as Yb:vanadate or of another laser active material.

The decoupling mirror 9 is a separate optical device having a dielectric coating on the front side facing the laser medium. The dielectric coating is partly reflective for laser light.

The resonator optionally includes a Q-switch 8 for generating an intensive and very short laser pulse. The Q-switch 8 is an acousto-optic modulator. Alternatively, the Q-switch 8 can be an electro-optic modulator. Alternatively, other kinds of pulse generation may be employed and, thus, other optical elements used. For example, in some embodiments, passive mode coupling using an absorber which can be saturated in the resonator are conceivable.

The optical components, i.e., the lens 10, the HR-end mirror 6, the solid state laser medium 7, the Q-switch 8 and the de-coupling mirror 9 are fixed on the mounting body 3 via soldering. Alternatively, the optical components are joined with the mounting body 3, e.g., by bonding, laser welding, clamping or screwing.

The mounting body 3 is composed of a doped silicate glass (Zerodur). Alternatively, glass-ceramic (e.g., ULE—Ultra Low Expansion titanium silicate glass) or ceramic (e.g., aluminum oxide, aluminum nitride or silicon oxide) are possible. These materials have a very low thermal expansion coefficient. Thereby, the arrangement of the laser resonator 5 can be constructed temperature stable. Also in this embodiment, the above-mentioned device for generating a temperature gradient can optionally be provided.

In this embodiment, the equipment 4 for deflecting the laser beam 2 is integrated in the mounting body 3 on which the laser resonator 5 is built. Thereby, the same thermal conditions may be obtained as in the laser resonator 5, whereby the entire laser machining device 1 can be constructed temperature stable so that an actual target position of the laser beam 2 essentially correlates to a predetermined target position.

By the integration of the device 4 for deflecting the laser beam 2 in the mounting body 3, it is possible to machine the mounting body 3 in similar processing steps for the generation of the laser resonator 5 as well as for the generation of the equipment 4. Handling devices and grippers used for positioning the optical components of the laser resonator 5 can also be used for an assembly of the MEMS and non-MEMS elements.

The angle detection device 19 and the angle of deflection correction control device 20 are optionally also provided in this embodiment.

As a further option, the laser machining device 1 is provided with a beam forming unit 24 including optical components for influencing the laser beam. The beam forming unit 24 is here only schematically illustrated and it can include components which are arranged, with respect to the laser beam, before and after the reflecting surface 15. Thereby, for example, the laser beam is widened before the reflecting surface 15 and it is focused to the workpiece after the reflecting surface 15.

Moreover, the optical components of the laser resonator or of the beam forming unit can be configured such that astigmatism can be corrected, e.g., by a combination of cylindrical lenses.

The laser machining device 1 can include one or several folding mirrors (redirection mirrors), wherein the angle of incidence onto the reflecting surface 15 is in a range from 10 degrees to 80 degrees.

Figure 5:
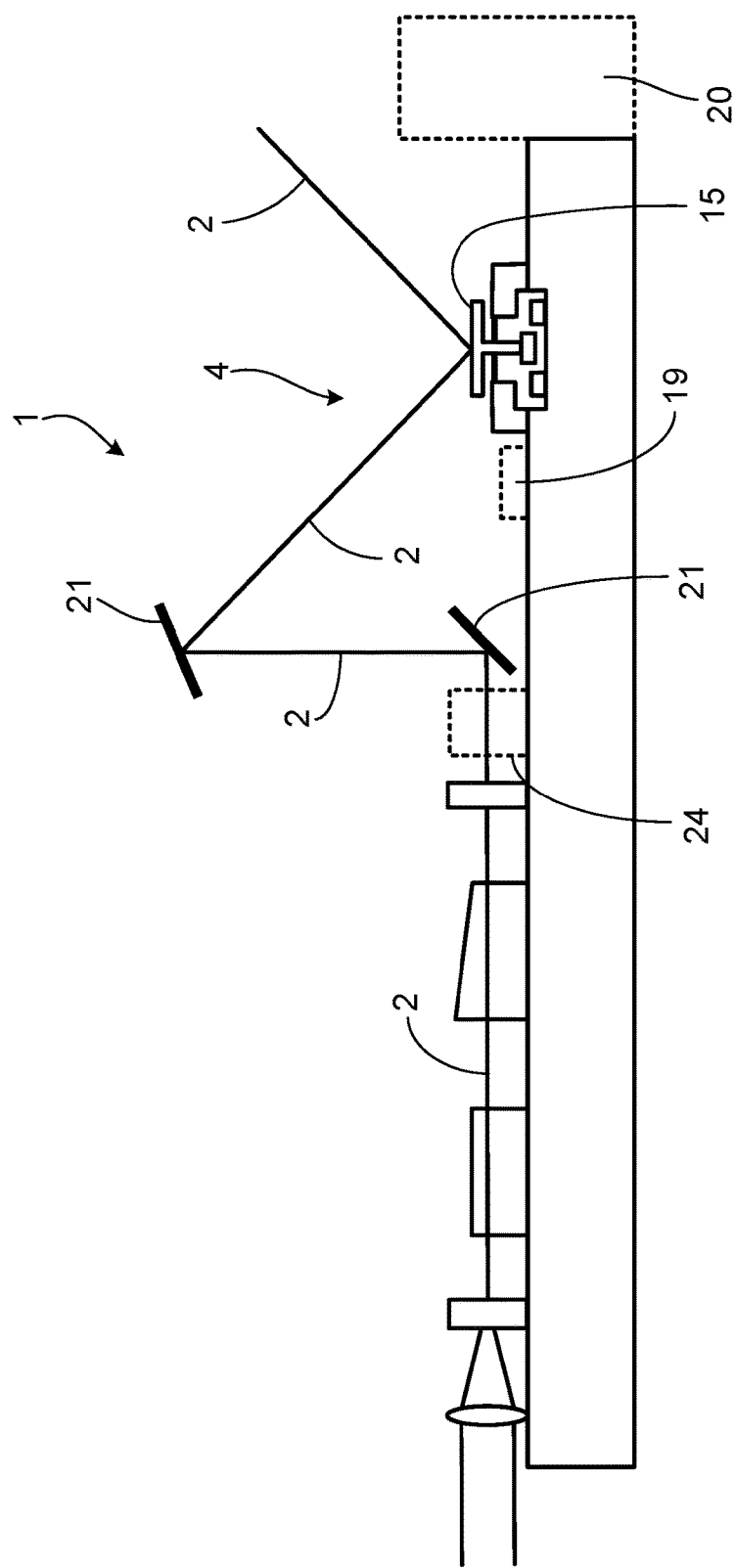
FIG. 5 shows a schematic diagram of yet another embodiment of the laser machining device having a second embodiment of the equipment for deflecting the laser beam.

As an example, the laser machining device 1 is shown with a second embodiment of the equipment 4 for deflecting a laser beam 2 in FIG. 5. The difference to the embodiment shown in FIG. 4 is that the laser beam 2 is redirected (folded) by two redirection mirrors 21 before the laser beam 2 impinges onto the reflecting surface 15 and is deflected from there. Hereby, the arrangement of the elements of the equipment 4 is such that the MEMS elements can be mounted more favorably than in the embodiments shown in FIGS. 1 to 4. The number of the redirection mirrors 21 is alternatively not limited to two redirection mirrors 21; generally any number suitable to redirect the beam can be used. Alternatively, the redirection mirrors can be arranged in a plane parallel with respect to the upper side of the mounting body 3.

Figure 6:
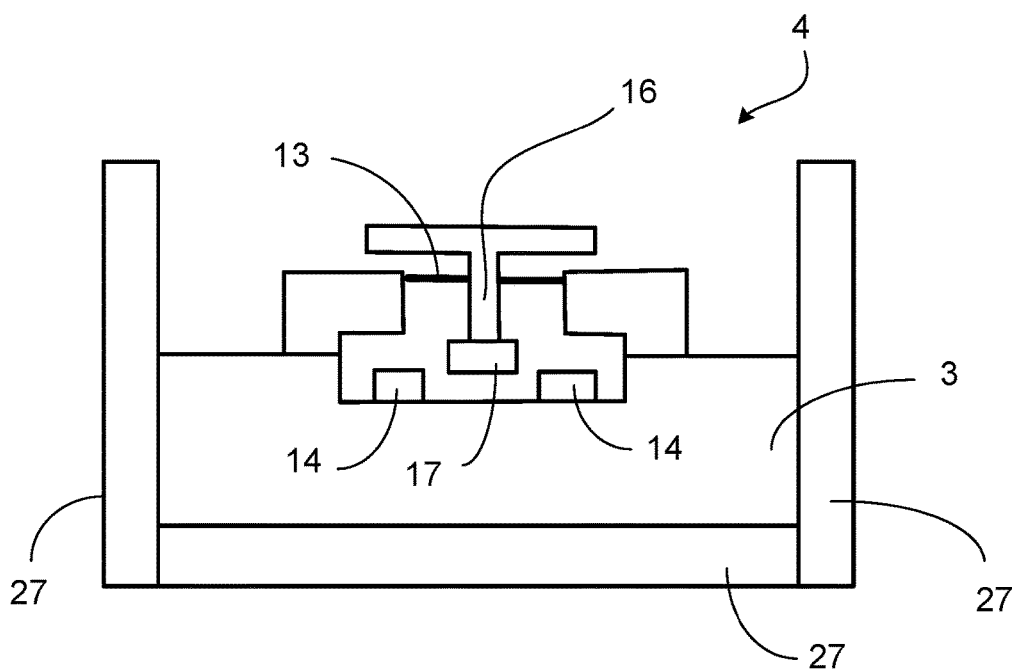
FIG. 6 shows a schematic diagram of a portion of a further embodiment of the equipment for deflecting the laser beam.

In FIG. 6, a portion of another embodiment of the equipment 4 for deflecting a laser beam is schematically shown. Around the equipment 4, a shielding 27 is attached here. This shielding 27 includes a layer of a material having high magnetic permeability (e.g., iron, Mu-metal (magnetically soft nickel-iron-alloy), etc.). Using the shielding 27, the magnetic field in the mounting body 3 (the mounting body being composed of a non-magnetizable material) generated by the magnet 17 and/or the current-carrying elements 14 is not influenced by outer magnetic fields.

Since the magnet 17 gravitates towards this layer, the shielding 27 is provided a sufficient distance from and concentrically with respect to the magnet 17. The force acting between the magnet 17 and the shielding 27 should be sufficiently small so that the flexible element 13 joined to the magnet 17 by the joining element 16 is not excessively deformed. In some embodiments, the distance between the shielding 27 and the magnet 17 is smaller than 20 mm, e.g., the distance is smaller than 10 mm in order to maintain the device as compact as possible.

All aforementioned embodiments are in particular combinable if no technical and/or commercial reasons contradict.

Referring generally to the disclosed embodiments, in use, either a laser beam 2 is generated by the laser beam source 22 or by pump light focused into the laser resonator 5 by the lens 10 is generated by the pump beam source 23, whereby a laser beam 2 is generated. After adjusting the predetermined deflection angle of the reflecting surface 15 by a control device (e.g., an electronic control module, not shown) of the laser machining device 1 and switching-on the laser beam 2 by the control device of the laser machining device 1, the laser beam 2 is deflected about the predetermined angle of deflection by the reflecting surface 15 of the structural member 12 and led onto a workpiece or focused onto the work-piece. The predetermined angle of deflection of the laser beam 2 is adjusted by adjusting the angle of deflection of the structural member 12 by the control device of the laser machining device 1 by controlling the current intensity through the pairs of coils 14 deflecting the structural member 12 by means of the magnet 17.

In the further progress of the machining, the deflection of the reflecting surface 15 by the pair of coils 14 is then controlled by the control device of the laser machining device 1 such that a laser beam 2 deflected by the reflecting surface 15 of the structural member 12 follows a predetermined portion of a track. After following the pre-determined portion of the track, the laser beam 2 is switched-off again. This following is either controlled from point to point or by following a defined trajectory. Thus, by synchronizing switching-on and switching-off or by power modulation of the laser beam 2 and by the deflection of the structural member 12, a requested marking can be applied. The workpiece can either be stationary or movable with respect to the equipment.

When the angle of deflection correcting control device 20 is provided, the actual position detected by the angle detection device 19 is processed such that deviations between the actual position and the predetermined position or between the detected trajectory and the predetermined trajectory are detected and corrected currents are output to the pair of coils 14. Thus, the actual position/trajectory is corrected to the predetermined position/trajectory so that a feedback system for an accuracy of the motion is provided.

Figure 7A:
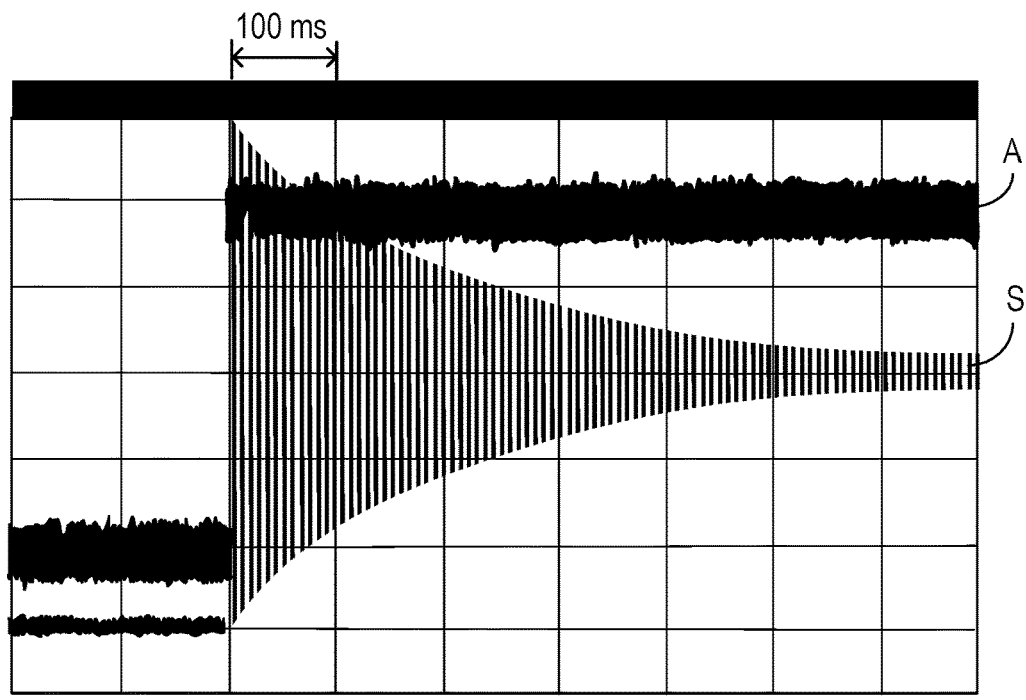
FIG. 7A shows a result of a step response of a scanner to a driving signal without any pre-compensation.
Figure 7B:
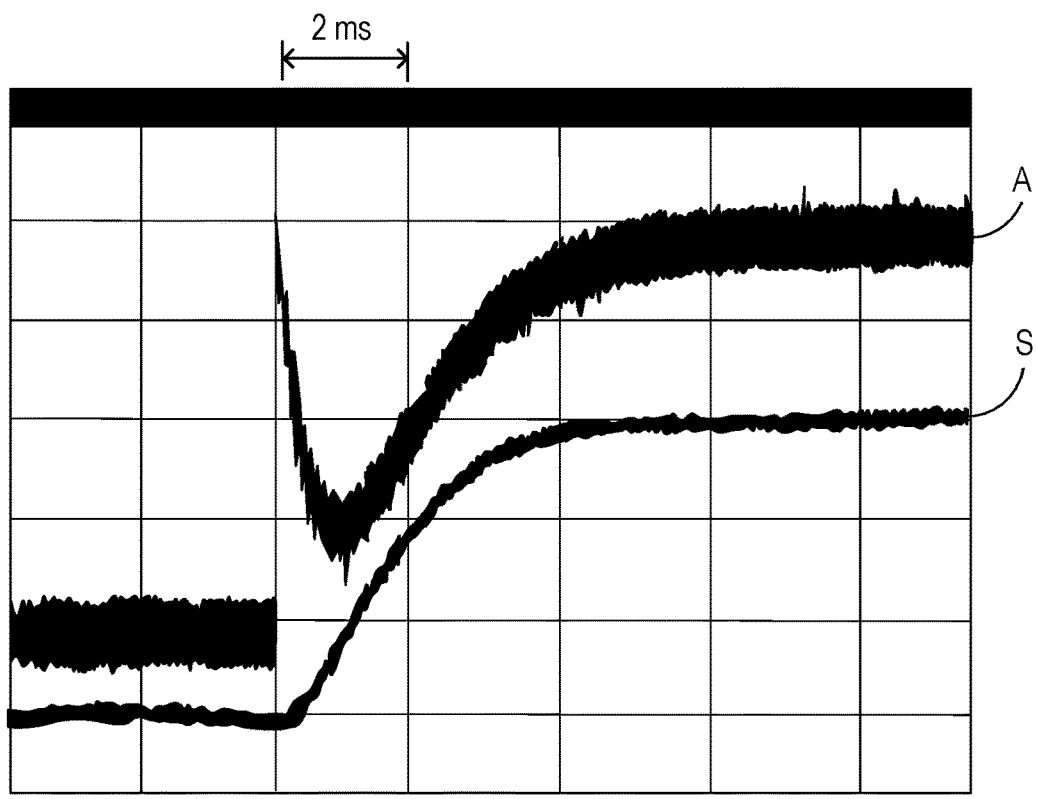
FIG. 7B shows a result of a step response of the scanner to a driving signal with the pre-compensation.

In order to enable a faster step response of the scanner to a control signal A, a pre-compensation of the control signal A can be made. The control signal A is formed by a control voltage. The pre-compensation can be executed according to, e.g., the publication "Sub-100 µs Settling Time and Low Volt-age Operation for Gimbal-less Two-Axis Scanners", Veljko Millanovic and Kenneth Castelino, in IEEE/LEOS Optical MEMS 2004, Takamatsu, Japan, August 2004. FIG. 7A shows a result of a step response S without the pre-compensation and FIG. 7B shows a result of the step response S with the pre-compensation. The step response S is detected by a PSD-signal. As to be seen here, with an exemplary 4×4 mm mirror having a resonance frequency of 164 Hz and being operated with 80 mA, the scanner mirror can be brought to a required angle, i.e., the laser signal can be directed to a required position within the machining area, in 5 ms with an appropriate pre-compensation (FIG. 7B) instead of in 700 ms without pre-compensation (FIG. 7A).

An alternative use is also conceivable in micro machining or in rapid prototyping.

Other embodiments are in the following claims.

What is claimed is:

1. A laser machining device for machining a workpiece, the laser machining device comprising:
    a laser beam source; and
    an equipment for deflecting a laser beam of the laser beam source towards the workpiece, the equipment comprising:
    a stationary mounting body comprising a chamber;
    one or more magnets and one or more pairs of coils, wherein at least a first magnet of the one or more magnets and at least a first pair of coils of the one or more pairs of coils are controllable such that the first magnet and the first pair of coils are attracted towards or repelled from each other upon triggering;
    a structural member having a reflecting surface and a joining structure arranged in a portion away from the reflecting surface, the first magnet being attached to the joining structure at an end of the joining structure opposite to the reflecting surface;
    a spring element, arranged below the reflecting surface or to a side of the reflecting surface, directly joining the structural member to the stationary mounting body, wherein the spring element is configured such that the structural member is pivotable with respect to a pivoting point by an angle of deflection around more than one axis non-perpendicular to the reflecting surface, the pivoting point being located at a crossing point between a longitudinal body axis of the joining structure and a plane within a region where the spring element contacts the joining structure;
    wherein the first magnet and the first pair of coils, the spring element, and the joining structure are accommodated in the chamber, and either the first magnet or the first pair of coils are coupled to the structural member and the first magnet and the first pair of coils are arranged and cooperate such that the structural member is pivotable about the axes non-perpendicular to the reflecting surface by a predetermined deflection angle to machine the workpiece during operation of the laser machining device, and
    wherein the equipment further comprises:
        an angle detection device for detecting an actual angle of deflection of the structural member; and
        an angle of deflection correcting control device for controlling a deflection of the structural member depending on the predetermined angle of deflection and the actual angle of deflection so that the actual angle of deflection corresponds to the predetermined angle of deflection,
    wherein the angle detection device comprises a piezo-resistive sensor.

2. The laser machining device of claim 1, wherein the first pair of coils is arranged to a side of the reflecting surface.

3. The laser machining device of claim 1, wherein the first pair of coils is arranged below the reflecting surface.

4. The laser machining device of claim 1, wherein the angle of deflection of the reflecting surface is at least ±5 degrees.

5. The laser machining device of claim 1, further comprising an optical device for focusing the laser beam onto the workpiece.

6. The laser machining device of claim 1, wherein the laser beam impinging onto the reflecting surface generates a laser spot having a pre-determined shape and maximum predetermined dimensions, and wherein the reflecting surface has a shape and dimensions corresponding substantially to the predetermined shape and the maximum dimensions of the laser spot.

7. The laser machining device of claim 1, comprising one or more MEMS members.

8. The laser machining device of claim 1, further comprising a control device for controlling a switching-on and a switching-off of the laser beam and for controlling a deflection about the predetermine angle of deflection so that a predetermined portion of a track can be followed with the laser beam on the workpiece.

9. The laser machining device of claim 1, further comprising a laser resonator attached to the stationary mounting body.

10. The laser machining device of claim 1, wherein the laser machining device is a laser marking device.

11. The laser machining device of claim 1, wherein the spring element attaches to the joining structure between the reflecting surface and the first magnet.

12. The laser machining device of claim 1, wherein the spring element attaches to the joining structure at two locations on opposing sides of the joining structure.

13. A laser machining device for machining a workpiece, the laser machining device comprising:
    a laser beam source; and
    an equipment for deflecting a laser beam of the laser beam source towards the workpiece, the equipment comprising:
    a stationary mounting body comprising a chamber;
    one or more magnets and one or more pairs of coils, wherein at least a first magnet of the one or more magnets and at least a first pair of coils of the one or more pairs of coils are controllable such that the first magnet and the first pair of coils are attracted towards or repelled from each other upon triggering,
    a structural member having a reflecting surface and a joining structure arranged in a portion away from the reflecting surface, the joining structure including the magnet in an end of the joining structure opposite to the reflecting surface;
    a spring element, arranged below the reflecting surface or to a side of the reflecting surface, directly joining the structural member to the stationary mounting body, wherein the spring element is configured such that the structural member is pivotable with respect to a pivoting point by an angle of deflection around more than one axis non-perpendicular to the reflecting surface, the pivoting point being located at a crossing point between the longitudinal body axis of a joining structure and a plane within a region where the spring element contacts the joining structure;

wherein the first magnet and the first pair of coils, the spring element and the joining structure are accommodated in the chamber, and either the first magnet or the first pair of coils are coupled to the structural member and the first magnet and the first pair of coils are arranged and cooperate such that the structural member is pivotable about the axes non-perpendicular to the reflecting surface by a predetermined deflection angle to machine the workpiece during operation of the laser machining device, wherein the first pair of coils is arranged to so that the coils rotate vertically with respect to another.

14. A laser machining device for machining a workpiece, the laser machining device comprising:

a laser beam source; and an equipment for deflecting a laser beam of the laser beam source towards the workpiece, the equipment comprising:

a stationary mounting body comprising a chamber;

one or more magnets and one or more pairs of coils, wherein a first magnet of the one or more magnets and a first pair of coils of the one or more pairs of coils are controllable such that the first magnet and the first pair of coils are attracted towards or repelled from each other upon triggering, a structural member having a reflecting surface and a joining structure arranged in a portion away from the reflecting surface, the joining structure including the first magnet in an end of the joining structure opposite to the reflecting surface;

a spring element, arranged below the reflecting surface or to a side of the reflecting surface, directly joining the structural member to the stationary mounting body, wherein the spring element is configured such that the structural member is pivotable with respect to a pivoting point by an angle of deflection around more than one axis non-perpendicular to the reflecting surface, the pivoting point being located at a crossing point between the longitudinal body axis of a joining structure and a plane within a region where the spring element contacts the joining structure;

wherein the first magnet and the first pair of coils, the spring element and the joining structure are accommodated in the chamber, and either the first magnet or the first pair of coils are coupled to the structural member and the first magnet and the first pair of coils are arranged and cooperate such that the structural member is pivotable about the axes non-perpendicular to the reflecting surface by a predetermined deflection angle to machine the workpiece during operation of the laser machining device, and the structural member comprises a dielectric coating on the reflecting surface and on an opposite side of the reflecting surface.

15. A laser machining device for machining a workpiece, the laser machining device comprising:

a laser beam source; and an equipment for deflecting a laser beam of the laser beam source towards the workpiece, the equipment comprising:

a stationary mounting body comprising a chamber;

one or more magnets and two or more pairs of coils, wherein a first magnet of the one or more magnets and a first pair of coils of the two or more pairs of coils are controllable such that the first magnet and the first pair of coils are attracted towards or repelled from each other upon triggering, a structural member having a reflecting surface and a joining structure arranged in a portion away from the reflecting surface, the joining structure including the magnet in an end of the joining structure opposite to the reflecting surface;

a spring element, arranged below the reflecting surface or to a side of the reflecting surface, directly joining the structural member to the stationary mounting body, wherein the spring element is configured such that the structural member is pivotable with respect to a pivoting point by an angle of deflection around more than one axis non-perpendicular to the reflecting surface, the pivoting point being located at a crossing point between the longitudinal body axis of a joining structure and a plane within a region where the spring element contacts the joining structure;

wherein the first magnet and the first pair of coils, the spring element and the joining structure are accommodated in the chamber, and either the first magnet or the first pair of coils are coupled to the structural member and the first magnet and the first pair of coils are arranged and cooperate such that the structural member is pivotable about the axes non-perpendicular to the reflecting surface by a predetermined deflection angle to machine the workpiece during operation of the laser machining device, and wherein at least two pairs of coils of the two or more pairs of coils are arranged rotated perpendicularly with respect to another.

\* \* \* \* \*